(12) United States Patent
Caunes et al.

(10) Patent No.: US 10,851,895 B2
(45) Date of Patent: Dec. 1, 2020

(54) BRAKING DEVICE

(71) Applicant: ContiTech Vibration Control GmbH, Hannover (DE)

(72) Inventors: Raphaël Caunes, Fleurieu sur Saone (FR); Romain Corrado, Monistrol / Loire (FR); Xavier Hennebelle, Chevrieres (FR)

(73) Assignee: ContiTech Vibration Control GmbH, Hannover (DE)

( * ) Notice: Subject to any disclaimer, the term of this patent is extended or adjusted under 35 U.S.C. 154(b) by 86 days.

(21) Appl. No.: 16/064,568

(22) PCT Filed: Nov. 22, 2016

(86) PCT No.: PCT/EP2016/078381
§ 371 (c)(1),
(2) Date: Jun. 21, 2018

(87) PCT Pub. No.: WO2017/133805
PCT Pub. Date: Aug. 10, 2017

(65) Prior Publication Data
US 2019/0003590 A1    Jan. 3, 2019

(30) Foreign Application Priority Data
Feb. 2, 2016  (FR) ...................................... 16 50823

(51) Int. Cl.
*F16J 15/3284* (2016.01)
*F16J 9/26* (2006.01)
(Continued)

(52) U.S. Cl.
CPC ............... *F16J 9/26* (2013.01); *B60T 11/236* (2013.01); *F16D 2125/08* (2013.01); *F16D 2200/0052* (2013.01); *F16D 2200/0056* (2013.01)

(58) Field of Classification Search
CPC ...... F16J 15/32; F16J 15/3204; F16J 15/3232; F16J 15/3236; F16J 15/56; B60T 11/236;
(Continued)

(56) References Cited

U.S. PATENT DOCUMENTS 4,891,117 A * 1/1990 Gardner, Sr. ........ B01D 25/215
                                                         204/253
5,328,178 A * 7/1994 Nies ...................... B60T 11/236
                                                         277/438

(Continued)

FOREIGN PATENT DOCUMENTS

GB         2342395 A       4/2000
JP         H0996363 A      4/1997
(Continued)

*Primary Examiner* — Gilbert Y Lee
(74) *Attorney, Agent, or Firm* — Gregory Adams; David Cate

(57) ABSTRACT

This braking device comprises a seal (1) having a first sealing part (2) made of a first material and a second sealing part (4) made of a second material different than the first material. In addition, the first material comprises PTFE, the second material comprises EPDM, and the first sealing part (2) and the second sealing part (4) are adhesively bonded together.

15 Claims, 1 Drawing Sheet

(51) Int. Cl.
*B60T 11/236* (2006.01)
*F16D 125/08* (2012.01)

(58) Field of Classification Search
CPC ......... F16D 2125/08; F16D 2200/0052; F16D 2200/0056
See application file for complete search history.

(56) References Cited

U.S. PATENT DOCUMENTS

| | | | |
|---|---|---|---|
| 6,543,785 B1* | 4/2003 | Katayama | F16J 15/102 |
| | | | 277/534 |
| 6,640,541 B2 | 11/2003 | Winkelmann et al. | |
| 6,786,489 B1* | 9/2004 | Hennemann | B60T 8/38 |
| | | | 277/437 |
| 2006/0214379 A1* | 9/2006 | James | F16J 15/166 |
| | | | 277/404 |
| 2009/0145701 A1 | 6/2009 | Piccoli et al. | |
| 2011/0140365 A1* | 6/2011 | Dietle | F16J 15/164 |
| | | | 277/336 |
| 2015/0096294 A1 | 4/2015 | Maeda et al. | |
| 2016/0281855 A1* | 9/2016 | Didwiszus | F16J 15/164 |

FOREIGN PATENT DOCUMENTS

| | | |
|---|---|---|
| JP | 201292976 A | 10/2013 |
| JP | 201575177 A | 11/2016 |

\* cited by examiner

BRAKING DEVICE

The present invention relates to a braking device, notably a braking device of the anti-lock braking system (ABS) type.

ABS systems conventionally comprise a pump intended to pump the brake fluid so as to regulate the braking pressure once the braking pressure has been released in the event of locking, or to generate a braking pressure for controlling the vehicle (path control, distance or speed control, emergency stop, parking assistance, partially or fully autonomous driving). As illustrated in FIG. 1, which shows a conventional pump 100 of an ABS type braking device, said pump 100 comprises an electric motor and a piston 200 which is driven in reciprocating rectilinear motion by way of the electric motor so as to pump the brake fluid. In order to protect the electric motor from the brake fluid, it is known practice to use a piston seal 300 around the piston 200. This four-lobe piston seal 300 is conventionally made of EPDM (ethylene propylene diene monomer). The piston seals 300 that are currently known are suitable for serial functions of ABS systems with which vehicles are equipped, for instance prevention of wheel locking in the event of braking or traction control. These piston seals 300 avoid leakage of brake fluid out of the system.

However, with the development of autonomous vehicles, additional functions such as skid prevention (path control), speed control, distance control, partially or fully assisted autonomous driving, anti-collision emergency braking or automatic parking assistance have been proposed. The multiplication of these functions is placing increased demands on ABS systems, in particular the pumps with which these systems are equipped. Consequently, the components of ABS systems with which future vehicles are intended to be equipped should be able to handle more intensive use than currently, and in particular the piston seals of the ABS system pumps against which the piston rubs. Because of this, current piston seals made of EPDM risk being subjected to more rapid wear in the event of more intensive loading of ABS systems and earlier leaks may arise.

Thus, the present invention aims to remedy this drawback by proposing a braking device that affords better-quality and longer-lasting sealing.

To this end, the subject of the present invention is a braking device for a motor vehicle, comprising a seal, characterized in that the seal comprises a first sealing part made of a first material and a second sealing part made of a second material different than the first material, in that the first material comprises PTFE and the second material comprises EPDM, and in that the first sealing part and the second sealing part are adhesively bonded together.

Therefore, the braking device according to the invention affords better sealing with a longer lifetime, and is thus suitable for ever more intensive loading. This is notably because the braking device comprises a composite seal comprising two adhesively bonded materials, forming a single component, the first part providing dynamic sealing while the second part provides static sealing.

The use of PTFE for the first, dynamic sealing part improves the lifetime of the seal by limiting wear caused by the repetitive motion of a piston of the ABS pump and protecting the second sealing part from the motion of the piston.

The use of EPDM for this second, static sealing part allows the seal to deform, both in order to be fitted in the ABS pump and, on account of its elasticity, to withstand pressure peaks which can arise in the pump.

The fact that the first and second sealing parts are bonded together by a binder allows the first and second parts to be fastened effectively and durably and also allows ease of assembly.

The seal is thus advantageously suitable for sealing an ABS pump piston, including for ever more intensive loading of the ABS pump.

According to one preferred embodiment, the first sealing part and the second sealing part each have a contacting surface, one of these contacting surfaces having a concave portion and the other of these contacting surfaces having a convex portion with a shape complementary to the concave portion.

In this way, the seal is even more resistant to axial loads. The risk of the first and second parts coming apart is limited. This therefore improves the lifetime of the seal.

According to one preferred embodiment, the first sealing part and the second sealing part are annular and arranged in a radial stack.

Thus, the seal is particularly suitable for providing sealing around a pump piston.

According to one preferred embodiment, the first sealing part and the second sealing part each have a contacting surface, and these contacting surfaces delimit one or more chicanes.

According to one preferred embodiment, the glue bonding the first sealing part and the second sealing part comprises a primer coating suitable for adhering to the first material and a secondary coating suitable for adhering to the primer coating and to the second material.

This feature improves the fastening of the first and second parts and thus improves the integrity of the seal over time. The seal is therefore more suitable for providing the sealing of moving parts in highly loaded systems.

According to one preferred embodiment, the glue bonding the first sealing part and the second sealing part extends only over the contacting surfaces of the first and second sealing parts.

This feature has the advantage of limiting manufacturing constraints and of ensuring quality adhesion over the entire zone of contact, preventing the materials from coming apart.

According to one preferred embodiment, the glue bonding the first sealing part and the second sealing part extends over the entire surface area of the contacting surfaces of the first and second sealing parts.

One advantage of this feature is that a single component without assembly is proposed, ensuring improved performance.

According to one preferred embodiment, the first material comprises a carbon filler.

According to one preferred embodiment, the second sealing part comprises an annular slot formed in a transverse face of this second sealing part.

Thus, the first sealing part is slaved to the pressure in the slot, which makes it possible to apply a radial pressure to the first sealing part by way of a lip that belongs to the second sealing part and is delimited between the slot and the first sealing part.

Further features and advantages of the present invention will become clearly apparent from the following detailed description of an embodiment, given by way of nonlimiting example, with reference to the appended drawings, in which:

FIGS. 2 and 3 show a seal 1 of a braking device according to one embodiment of the invention. The braking device is a braking device for a motor vehicle, preferably of the anti-lock braking system (ABS) type.

The seal 1 of the braking device according to the invention is intended to seal a component of the braking device which is in contact with a brake fluid. The brake fluid may be a brake fluid of the DOT type. The seal 1 is thus suitable for use with this type of brake fluid.

Figure 1:
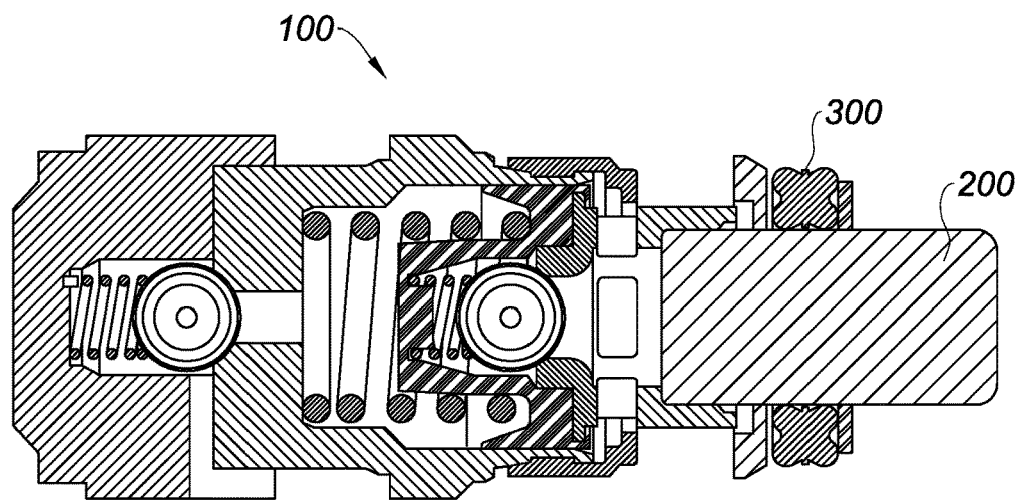
FIG. 1 is a view in partial section of a pump of an ABS braking device of the prior art, showing a conventional piston seal.

Preferably, the braking device comprises the seal 1 and a pump element around which the seal 1 extends. Thus, the seal 1 is intended to provide sealing at this pump element, which may be the piston of a pump of the braking device, notably by replacing the piston seal 300 shown in FIG. 1. In particular, the seal 1 is configured to provide sealing between this pump element and a casing of the pump.

The seal 1 is a composite seal comprising a first sealing part 2 made of a first material and a second sealing part 4 made of a second material. The first sealing part 2 and the second sealing part 4 are fastened together by adhesive bonding. The first sealing part 2 and the second sealing part 4 are thus secured together by means of a glue or binder. Therefore, the two sealing parts 2, 4 form a single component.

The first sealing part 2 is intended to bear against the pump element, while the second sealing part 4 is intended to bear against an inner wall of a casing of the pump. The seal 1 is thus intended to be interposed between the piston and the casing of a pump of an ABS device.

The first sealing part 2 is made of a first material based on polytetrafluoroethylene (PTFE), so as to provide dynamic sealing and to give the seal 1 wear resistance. In addition, the first material can advantageously comprise carbon fillers.

The second sealing part 4 is made of a second material which is an elastomer based on ethylene propylene diene monomer (EPDM), so as to provide the seal 1 with a degree of elasticity, thereby allowing the latter to deform while it is being fitted in an ABS pump and to withstand high pressure peaks.

Figure 2:
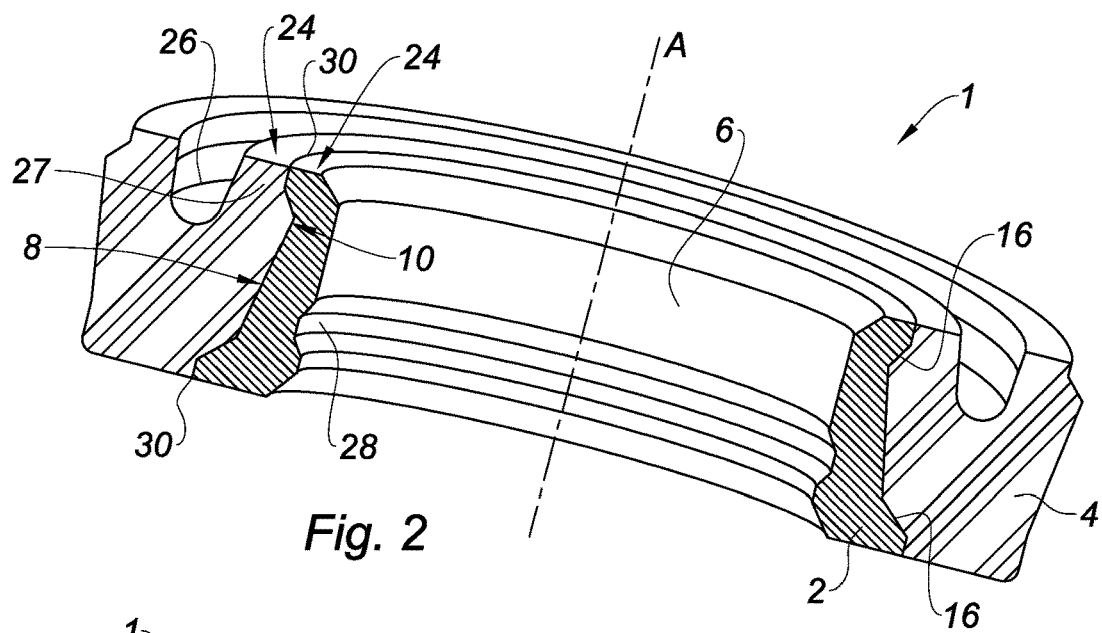
FIG. 2 is a perspective sectional view of a seal of a braking device according to one embodiment of the invention.
Figure 3:
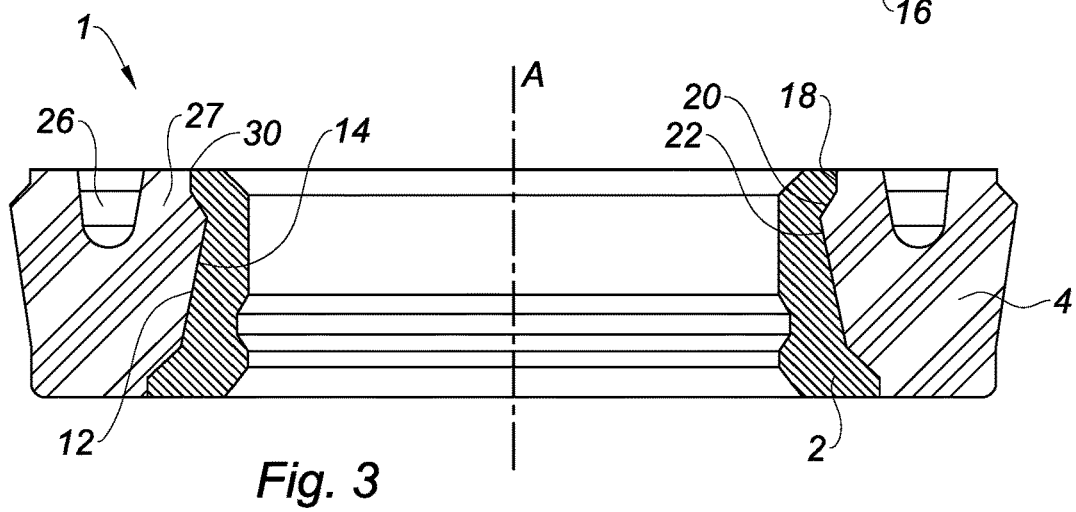
FIG. 3 is a sectional side view of a seal of a braking device according to one embodiment of the invention.

As shown in FIGS. 2 and 3, the seal 1 advantageously has an annular shape. The seal 1 delimits an opening 6 through which the pump element is intended to extend.

The first sealing part 2 and the second sealing part 4 in this case have an annular shape. The first sealing part 2 and the second sealing part 4 can be arranged, as illustrated in FIGS. 2 and 3, in a radial stack; that is to say that the sealing parts 2, 4 form two concentric rings alongside one another, one being enclosed in the other.

Advantageously, the first sealing part 2 that is intended to provide dynamic sealing is arranged inside the second sealing part 4 that is intended to provide static sealing. Thus, the first sealing part 2 advantageously forms the internal part of the seal 1 while the second sealing part 4 forms the external part.

In particular, the seal 1 can extend around an ABS pump piston, the first sealing part 2 being in contact with the piston and the second sealing part 4 being in contact with the casing of the pump. This makes it possible to protect an electric drive motor of the ABS pump effectively and with a long lifetime, and to prevent leakage of the brake fluid.

Although not shown, the second sealing part 4 could, conversely, be arranged inside the first sealing part 2. The second sealing part 4 would then form the internal part of the seal 1 while the first sealing part 2 would form the external part. This may be the case for a seal 1 positioned for example in a groove of the piston, the dynamic sealing then needing to be ensured in the external part.

As indicated above, the seal 1 comprises a binder or glue interposed between the first and the second sealing part 2, 4 so as to bond them together.

In order to ensure effective fastening of the first sealing part 2 and the second sealing part 4, and thus to contribute towards an improved lifetime of the seal 1, the glue advantageously comprises a first layer, or primer coating, suitable for adhering to the material of the first sealing part 2, and preferably a second layer, or secondary coating, suitable for adhering to the primer coating and to the second sealing part 4.

The glue is advantageously suitable for securing elastomeric materials. The glue used may be a water-based glue. Preferably, the glue comprises a primer coating having one or more elements selected from a phenolic resin, a halogenated polymer, and an organic solvent comprising xylene and/or methyl isobutyl ketone (MIBK). If need be, the glue can comprise a secondary coating preferably having one or more elements selected from chlorosulfonated polyethylene, a halogenated polymer and xylene. By way of nonlimiting example, the glue can be a LORD Chemosil® 211 binder for the primer coating and a Chemosil® NL 411 binder for the secondary coating or more generally any other glue suitable for securing EPDM and PTFE.

The first sealing part 2 and the second sealing part 4 each have a contacting surface 8, 10. The contacting surface 8 is formed for example on an external wall of the first part 2, while the contacting surface 10 is formed for example on an internal wall of the second sealing part 4. The contacting surface 8 of the first sealing part 2 is positioned in a manner bearing against the contacting surface 10 of the second sealing part 4.

The glue extends between these contacting surfaces 8, 10, and preferably only between the contacting surfaces 8, 10. According to one advantageous possibility, the glue extends over the entire surface area of the contacting surfaces 8, 10.

As can be seen in FIGS. 2 and 3, the contacting surfaces 8, 10 have complementary shapes. Thus, the contacting surfaces 8, 10 are intended to be interlocked.

In particular, one of these surfaces, for example the contacting surface 8 of the first sealing part 2, has a concave portion 12, and the other of these surfaces, such as the contacting surface 10 of the second sealing part 4, has a convex portion 14 with a complementary shape to the concave portion 12.

Thus, the second sealing part 4 can have a radial protrusion or slot that is intended to interlock with a cavity or groove of the first sealing part 2.

The contacting surface 8 can occupy any external face of the first sealing part 2. The contacting surface 10 can occupy any internal face of the second sealing part 4.

If need be, the first sealing part 2 and the second sealing part 4 can have one or more coplanar transverse faces 24.

The second sealing part 4 advantageously comprises an annular slot or groove 26 formed on one side of the second sealing part 4, and more particularly on at least one transverse end face 24 of the latter. This slot 26 is preferably U-shaped or V-shaped.

An annular lip portion 27 which is intended to apply radial pressure to the first sealing part 2 in the event of high pressure thus extends between the slot 26 and the first sealing part 2.

In other words, the pressure exerted by this lip portion 27 on the first sealing part 2 is slaved to the pressure in the braking device.

An internal wall of the first sealing part 2 can have a radial groove 28.

In addition, it will be noted that the intersecting lines 30 of the lateral faces 24 of the first sealing part 2 and of the second sealing part 4 have a radial offset; that is to say that one of them is closer to a central axis A than the other of these two intersecting lines. This provides an increase in resistance over time to repetitive axial loads.

Furthermore, the contacting surfaces 8, 10 can advantageously be shaped to delimit one or more chicanes 16. For example, each contacting surface 8, 10 can comprise two or three adjacent, consecutive inclined faces 18, 20, 22. Preferably, the chicane(s) 16 is/are arranged at the edge of the contacting surfaces 8,10 so as to further protect a central zone of the contacting surfaces 8, 10 from the outside environment.

Of course, the invention is in no way limited to the embodiment described above, this embodiment only having been given by way of example. Modifications are possible, notably from the point of view of the makeup of the various elements or by the substitution of technical equivalents, without otherwise departing from the scope of protection of the invention.

The invention claimed is:

1. A braking device for a motor vehicle, the braking device comprising a seal, wherein the seal comprises a first sealing part made of a first material and a second sealing part made of a second material different than the first material, wherein the first material comprises PTFE and the second material comprises EPDM, and wherein the first sealing part and the second sealing part are adhesively bonded together;

wherein the first sealing part has a contacting surface in contact with and sealing an ABS piston of the braking device; and an ABS pump having a wall in contact with the second sealing part and a piston in contact with the first sealing part.

2. The braking device as claimed in claim 1, wherein the second sealing part has a second contacting surface, the contacting surface of the first part having a concave portion and the second contacting surface having a convex portion with a shape complementary to the concave portion.

3. The braking device as claimed in claim 1, wherein the first sealing part and the second sealing part are annular and arranged in a radial stack.

4. The braking device as claimed in claim 1, wherein the first sealing part and the second sealing part include contacting surfaces to delimit one or more chicanes.

5. The braking device as claimed in claim 1, wherein the first sealing part and the second sealing part are adhesively bonded together with a glue, and wherein the glue bonding the first sealing part and the second sealing part each comprise a primer coating suitable for adhering to the first material and a secondary coating suitable for adhering to the primer coating and to the second material.

6. The braking device as claimed in claim 1, wherein the first sealing part and the second sealing part are adhesively bonded together with a glue, and wherein the glue bonding the first sealing part and the second sealing part extends only over contacting surfaces of the first and second sealing parts.

7. The braking device as claimed in claim 1, wherein the first sealing part and the second sealing part are adhesively bonded together with a glue, and wherein the glue bonding the first sealing part and the second sealing part extends over the entire surface area of the first and second sealing parts.

8. The braking device as claimed in claim 1, wherein the first material comprises a carbon filler.

9. The braking device as claimed in claim 1, wherein the second sealing part comprises an annular slot formed in a transverse face of this second sealing part.

10. The braking device of claim 1, wherein the second sealing part has a second contact surface to bear against an inner wall of a casing of a pump of the braking device.

11. The braking device of claim 1, wherein the second sealing part is arranged within the first part.

12. The braking device of claim 1, wherein the second sealing part has an elasticity selected based on fitting within an ABS pump and to withstand high pressure leaks.

13. A braking device for a motor vehicle, the braking device comprising a seal, wherein the seal comprises a first sealing part made of a first material and a second sealing part made of a second material different than the first material, wherein the first material comprises PTFE and the second material comprises EPDM, and wherein the first sealing part and the second sealing part are adhesively bonded together;

wherein the first sealing part has a contacting surface in contact with and sealing an ABS piston of the braking device; and wherein the second sealing part includes a slot portion and an annular lip portion to apply radial pressure to the first sealing part in the event of high pressure between the slot portion and the first sealing part.

14. The braking device of claim 13, wherein the slot portion is U shaped.

15. The braking device of claim 14, wherein the first sealing part has a radial groove.

* * * * *